United States Patent
Kikuchi et al.

(10) Patent No.: US 9,709,092 B2
(45) Date of Patent: Jul. 18, 2017

(54) FLUID DYNAMIC BEARING, MOTOR, AND OPTICAL DEFLECTOR

(71) Applicant: NIDEC COPAL ELECTRONICS CORPORATION, Tokyo (JP)

(72) Inventors: Takahiro Kikuchi, Iruma (JP); Takeshi Hijiya, Iruma (JP); Toshiya Uchida, Iruma (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/123,524

(22) PCT Filed: May 11, 2015

(86) PCT No.: PCT/JP2015/063479
§ 371 (c)(1),
(2) Date: Sep. 2, 2016

(87) PCT Pub. No.: WO2015/174370
PCT Pub. Date: Nov. 19, 2015

(65) Prior Publication Data
US 2017/0074320 A1    Mar. 16, 2017

(30) Foreign Application Priority Data

May 12, 2014  (JP) ................. 2014-098683

(51) Int. Cl.
*F16C 17/02*    (2006.01)
*F16C 32/06*    (2006.01)
(Continued)

(52) U.S. Cl.
CPC .......... *F16C 32/0685* (2013.01); *F16C 17/02* (2013.01); *F16C 32/0614* (2013.01);
(Continued)

(58) Field of Classification Search
CPC .... F16C 17/026; F16C 35/02; F16C 2370/22; G02B 26/121; H02K 7/086; H02K 5/165
See application file for complete search history.

(56) References Cited

U.S. PATENT DOCUMENTS 4,607,908 A * 8/1986 Ishida ................... F16C 17/026
359/200.1
5,069,515 A * 12/1991 Itami .................... G02B 26/121
310/90

(Continued)

FOREIGN PATENT DOCUMENTS

JP    H05-064819 U    8/1983
JP    S59-017019 A    1/1984
(Continued)

OTHER PUBLICATIONS

International Search Report issued in PCT/JP2015/063479; mailed Jun. 9, 2015.

*Primary Examiner* — Thomas R. Hannon
(74) *Attorney, Agent, or Firm* — Studebaker & Brackett PC

(57) ABSTRACT

Provided are a fluid dynamic bearing, a motor, and an optical deflector, for which a fixed shaft can be attached with little axial eccentricity. The bearing (10) is equipped with a fixed shaft (11), a sleeve (20) provided so as to be capable of rotating around the fixed shaft (11), dynamic pressure generating sections (22, 23) provided in the sleeve (20), and a lower case (30) for securing the lower end (11a) of the fixed shaft (11). In addition, the bearing is equipped with a retaining case (40), which has a chuck (52) that retains the upper end (11b) of the fixed shaft (11) secured by the lower case (30), and which can be secured to the lower case (30) in a state that does not generate pressure causing the axial center of the fixed shaft (11) to move.

18 Claims, 9 Drawing Sheets

(51) Int. Cl.
*F16C 35/02* (2006.01)
*G02B 26/12* (2006.01)
*H02K 5/16* (2006.01)
*H02K 7/08* (2006.01)

(52) U.S. Cl.
CPC .............. *F16C 35/02* (2013.01); *G02B 26/12* (2013.01); *G02B 26/121* (2013.01); *H02K 5/16* (2013.01); *H02K 7/08* (2013.01); *F16C 2370/20* (2013.01); *F16C 2380/26* (2013.01)

(56) References Cited

U.S. PATENT DOCUMENTS

| | | | |
|---|---|---|---|
| 5,769,544 A * | 6/1998 | Suzuki | F16C 17/02 384/115 |
| 7,056,024 B2 * | 6/2006 | Weingord | F16C 17/026 384/100 |
| 2002/0002099 A1 | 1/2002 | Hara et al. | |

FOREIGN PATENT DOCUMENTS

| | | |
|---|---|---|
| JP | S61-18490 Y2 | 6/1986 |
| JP | H01-090022 U | 6/1989 |
| JP | H02-143222 A | 6/1990 |
| JP | 2645773 B2 | 8/1997 |
| JP | 3084600 B2 | 9/2000 |
| JP | 2002-017062 A | 1/2002 |
| JP | 2008-045592 A | 2/2008 |

\* cited by examiner

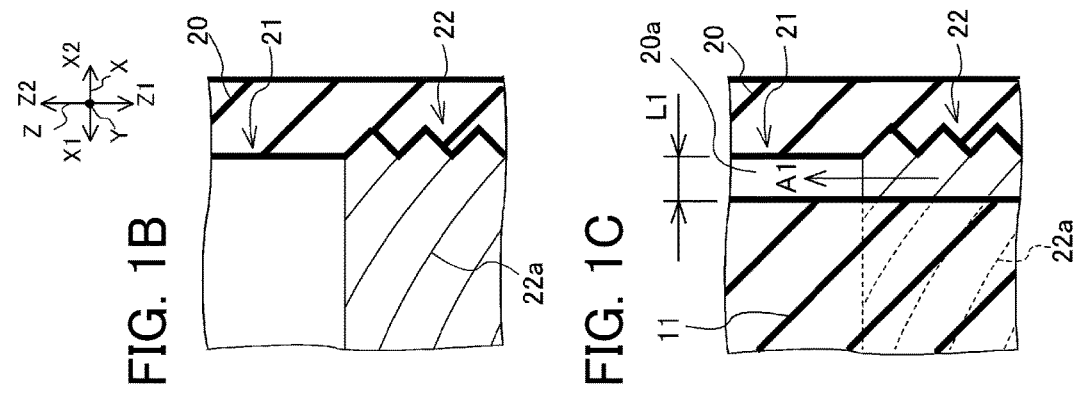
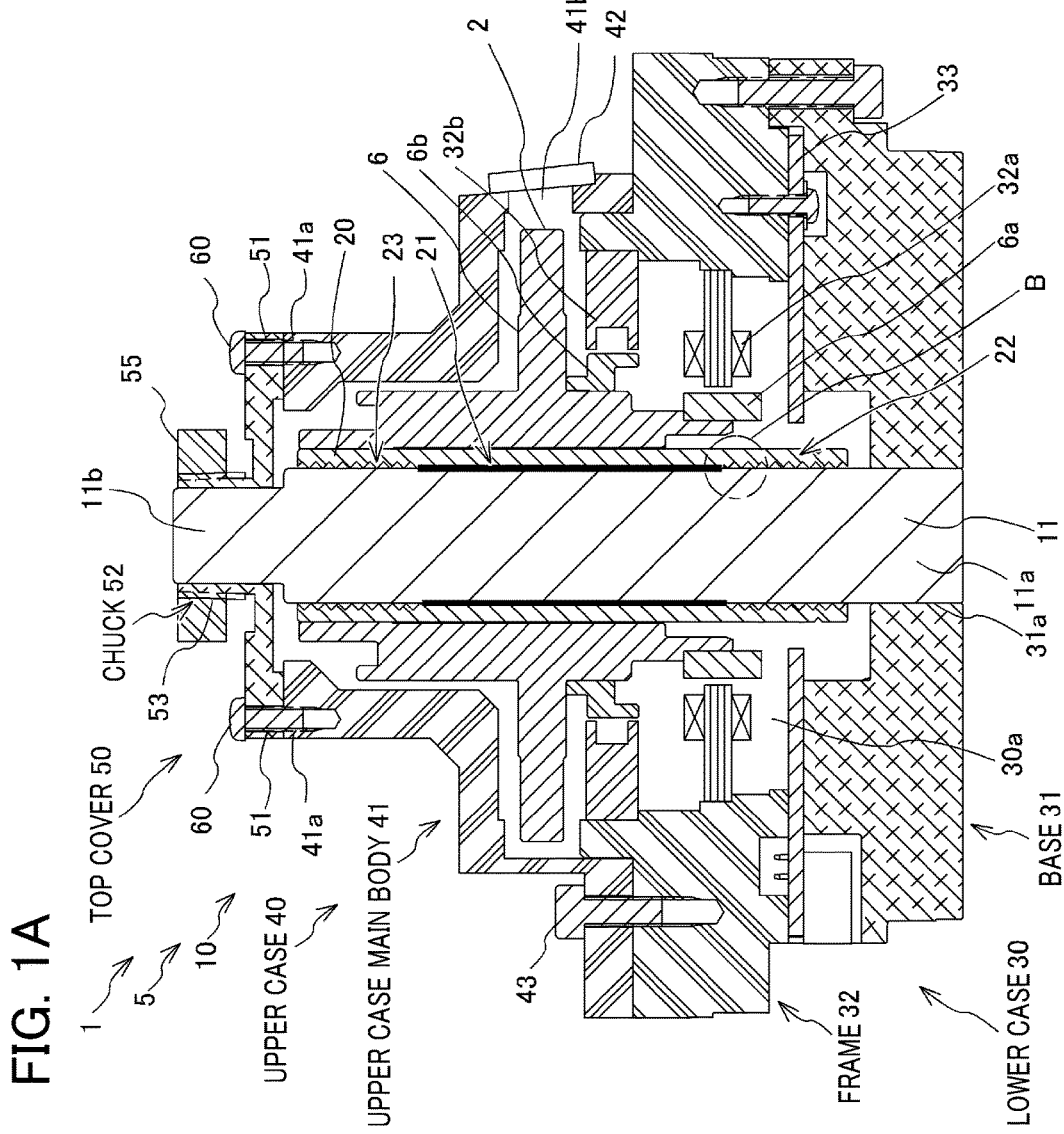

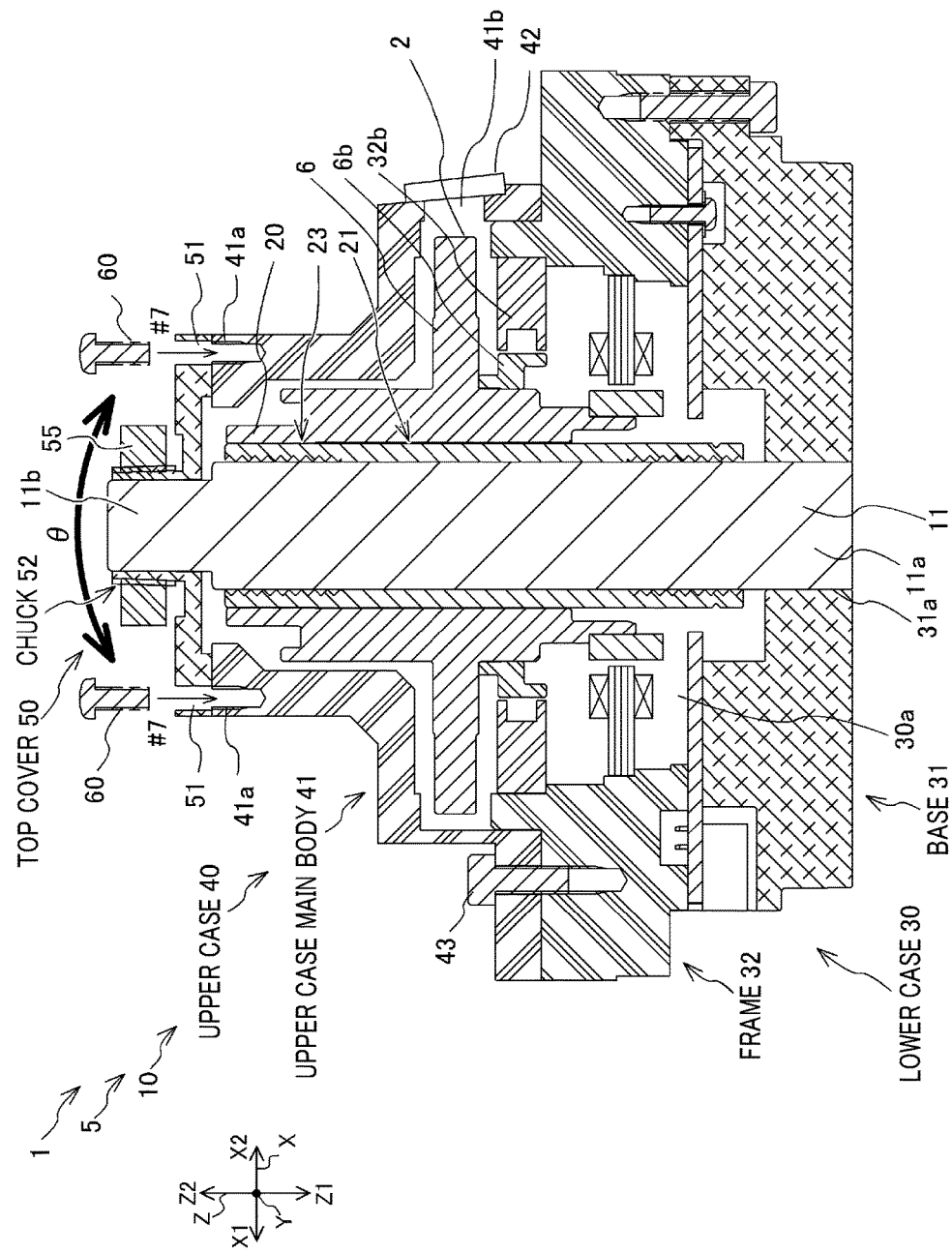

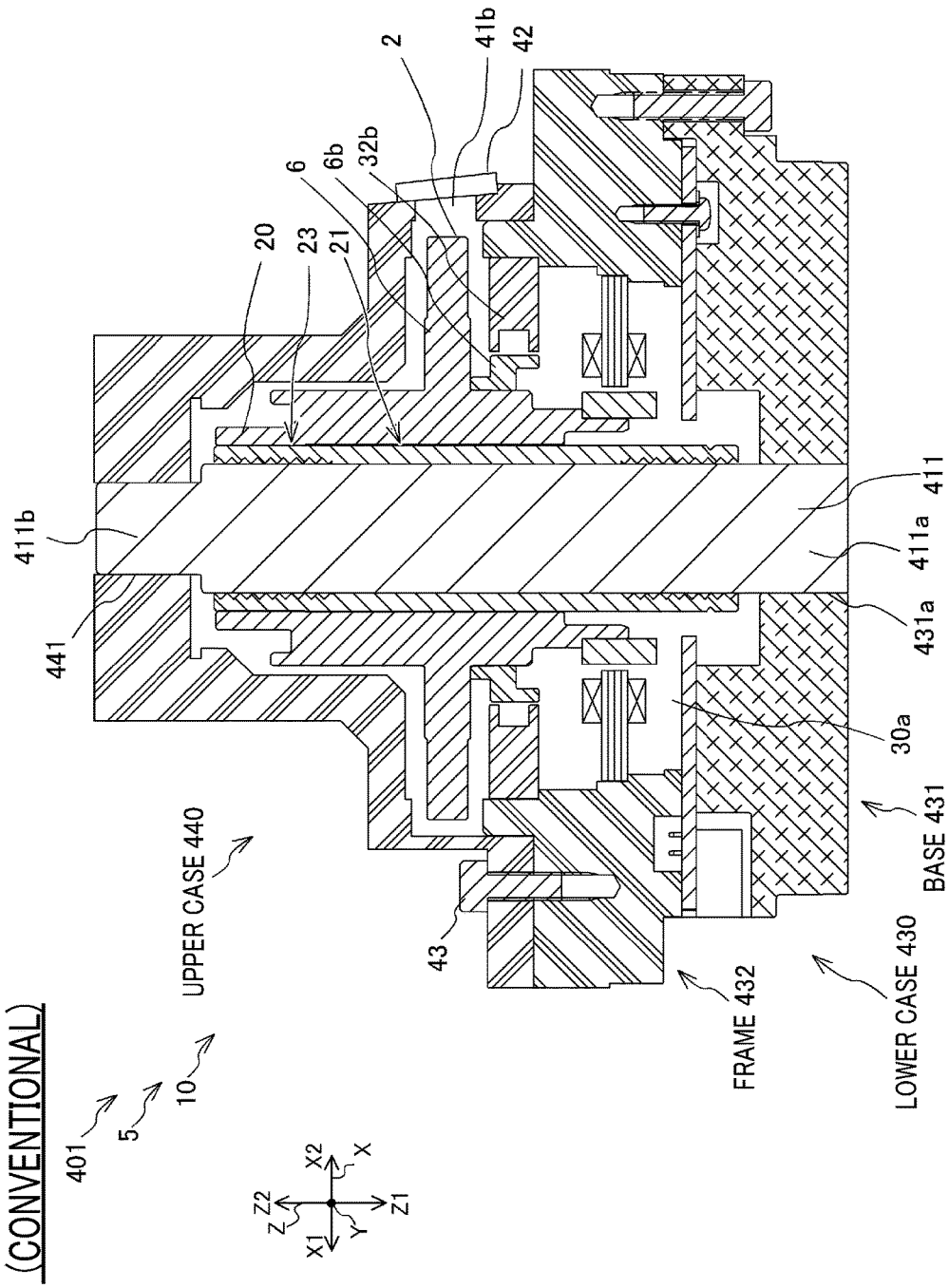

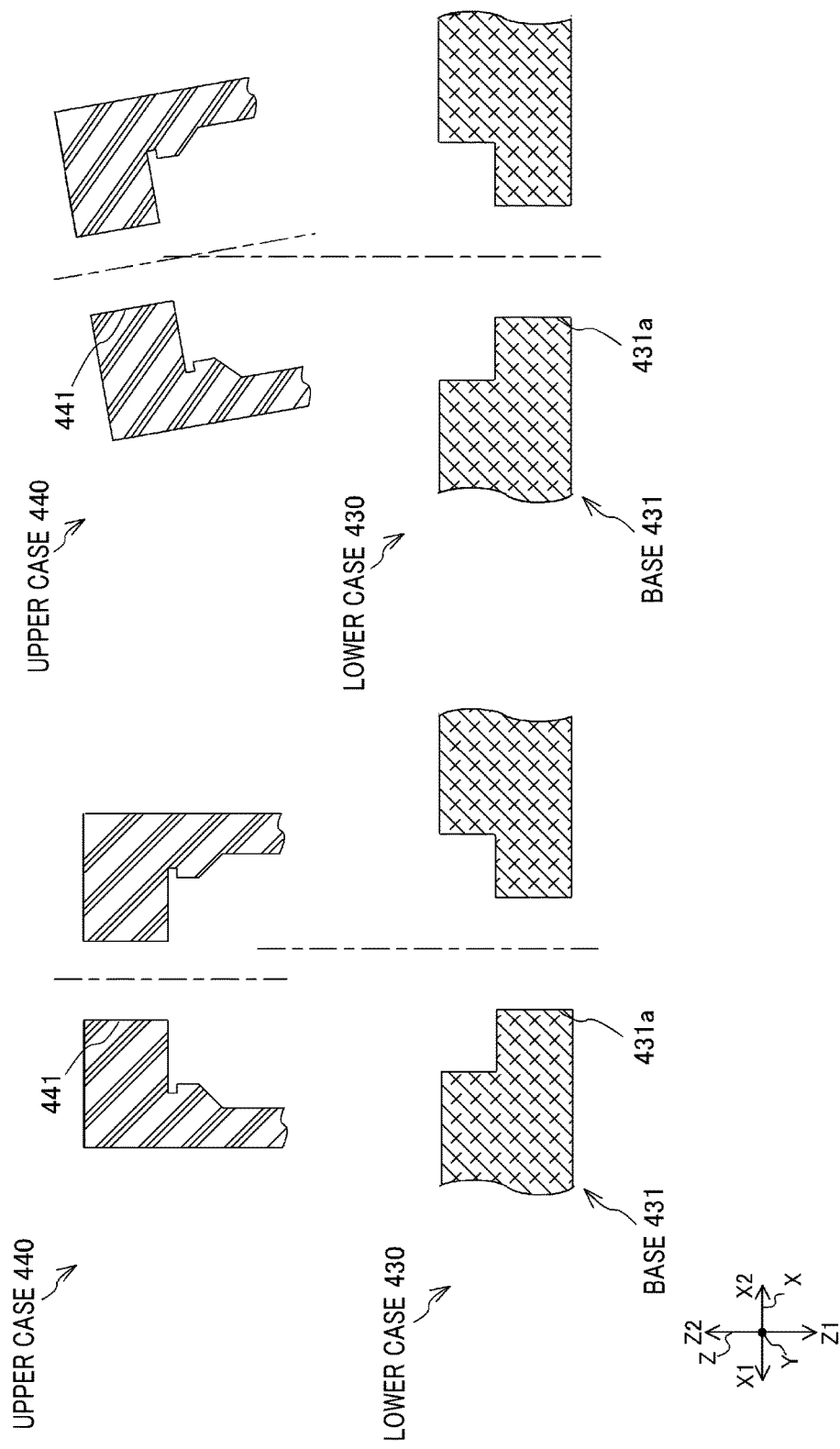

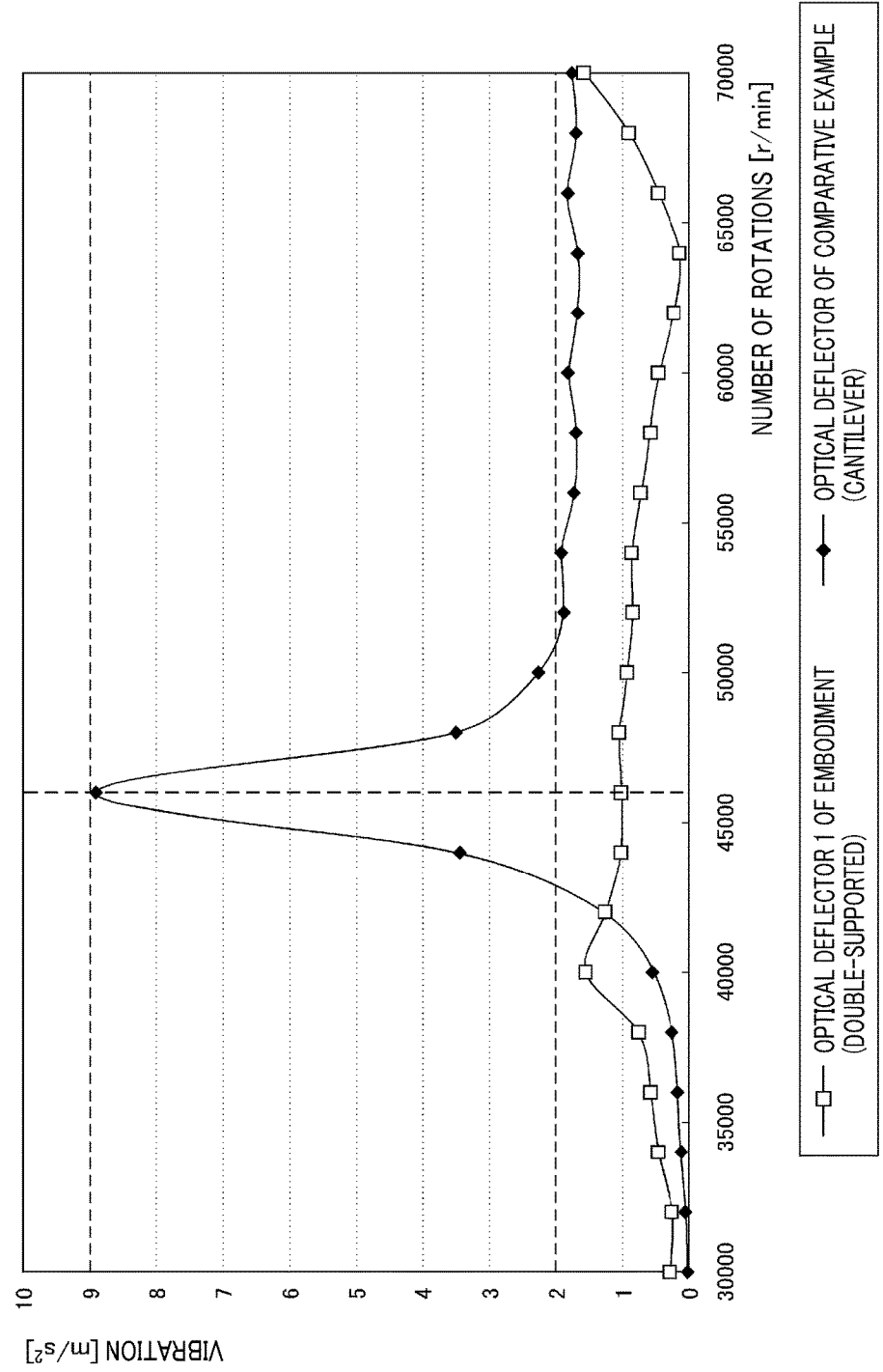

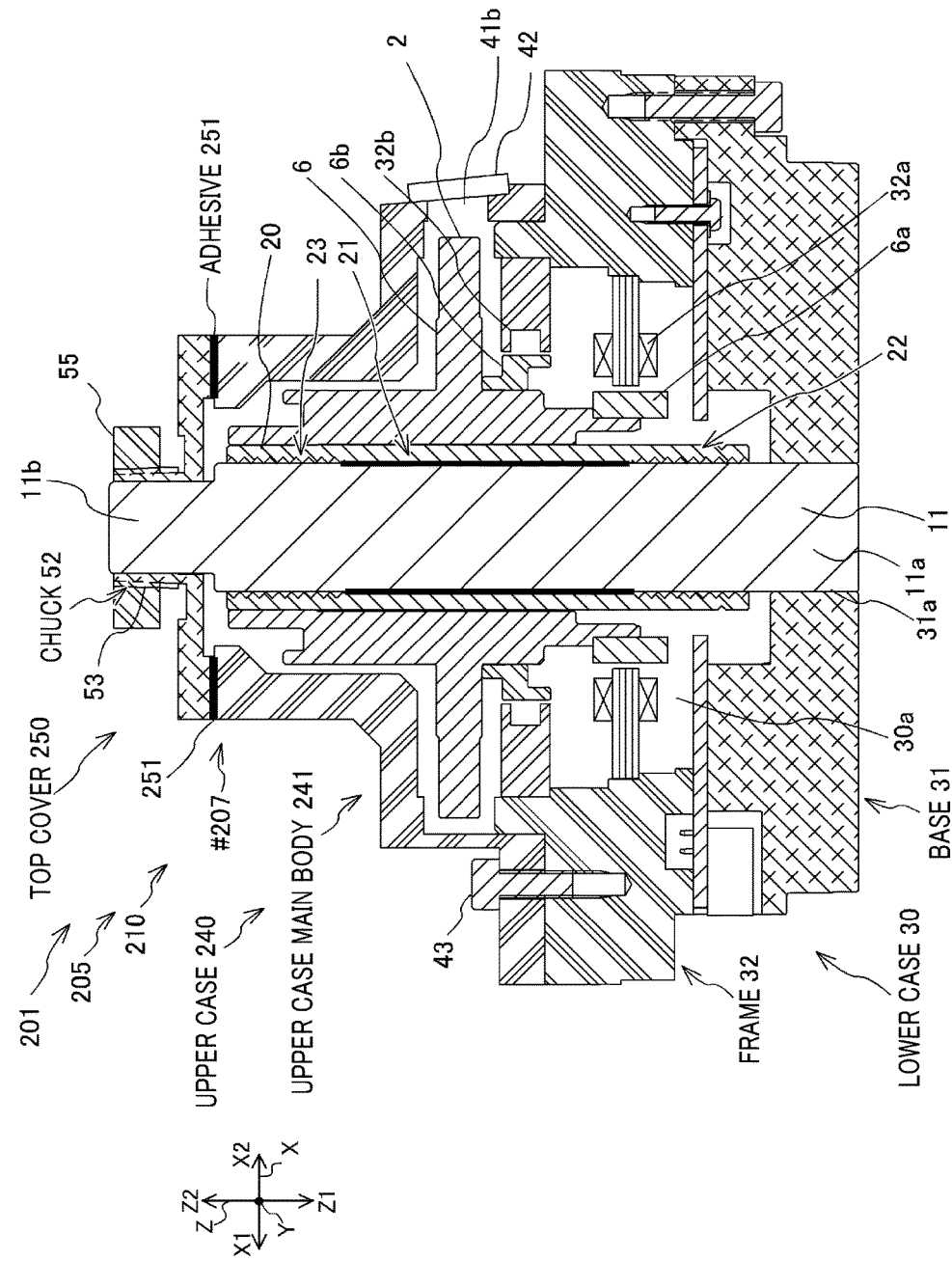

US 9,709,092 B2

FLUID DYNAMIC BEARING, MOTOR, AND OPTICAL DEFLECTOR

TECHNICAL FIELD

The present invention relates to a fluid dynamic bearing provided with a fixed shaft, a motor, and an optical deflector.

BACKGROUND ART

Conventionally, air dynamic bearings, a fixed shaft of which is fixed at both ends thereof onto a case and the like, have been known (for example, Patent Documents 1 to 4).

However, a position of one end of the fixed shaft is defined while the other end of the fixed shaft has been fixed at a time of mounting the fixed shaft. Given this, if the position of the one end is largely misaligned from an attachment position for the one end provided at the case, problems of performance degradation and reduced lifetime of the fluid dynamic bearing may arise due to axial eccentricity of the fixed shaft caused by an excessive force applied to the fixed shaft.

Patent Document 1: Japanese Registered Patent No. 3084600
Patent Document 2: Japanese Registered Patent No. 2645773
Patent Document 3: Japanese Unexamined Utility Model Application Publication No. H01-90022
Patent Document 4: Japanese Unexamined Patent Application Publication No. S59-17019

DISCLOSURE OF THE INVENTION

Problems to be Solved by the Invention

A problem to be solved by the present invention is to provide a fluid dynamic bearing that is fixable with reduced axial eccentricity of a fixed shaft, a motor, and an optical deflector.

Means for Solving the Problems

The present invention solves the problem by the following means. It should be noted that, for the sake of understanding, following descriptions include reference numerals in accordance with embodiments of the present invention; however, the present invention is not limited thereto. Furthermore, configurations referred to with reference numerals can be appropriately refined and at least a part thereof can be replaced by another component.

In a first aspect of the present invention, a fluid dynamic bearing is provided, which includes: a fixed shaft (11); a sleeve (20) provided rotatably around the fixed shaft; a dynamic pressure generating portion (22, 23) provided to at least one of the fixed shaft and the sleeve; and a fixing case (30, 330) configured to fix a first end (11a) of the fixed shaft. The fluid dynamic bearing further includes a retaining case (40, 240, 340) that has a chuck (52) for retaining a second end (11b) of the fixed shaft that is fixed by the fixing case, the retaining case being configured to be fixable to the fixing case without generating a force to cause a central axis of the fixed shaft to move. In a second aspect of the present invention, the fluid dynamic bearing according to the first aspect is provided, in which the retaining case (40, 240) includes: a retainer (50, 250) provided with the chuck (52) for retaining the second end (11b) of the fixed shaft (11); and a case main body (41, 241) to which the retainer is freely attached. In a third aspect of the present invention, the fluid dynamic bearing according to the second aspect is provided, which includes a fastening portion (41a, 51) at which the retainer (50) is fastened freely to the case main body (41) with a screw. In a fourth aspect of the present invention, the fluid dynamic bearing according to any one of the first to third aspects is provided, in which the chuck (52) is provided with a deformable retainer (53a) configured to be in contact with the fixed shaft (11) by elastic deformation, such that the deformable retainer (53a) retains the fixed shaft (11). In a fifth aspect of the present invention, a motor (5, 205, 305) is provided, which includes the fluid dynamic bearing (10, 210, 310) according to any one of the first to fourth aspects. In a sixth aspect of the present invention, an optical deflector (1, 201, 301) is provided, which includes the motor (5, 205, 305) according to the fifth aspect.

Effects of the Invention

The present invention provides the fluid dynamic bearing that is fixable with reduced axial eccentricity of the fixed shaft, the motor, and the optical deflector.

BRIEF DESCRIPTION OF THE DRAWINGS

Each of FIGS. 1A-1C is a cross-sectional view of an optical deflector 1 according to a first embodiment;
FIG. 4 is still another diagram illustrating the manufacturing method of the optical deflector according to the first embodiment;
FIG. 5 is a cross-sectional view of an optical deflector of Comparative Example (conventional art);
FIGS. 6A and 6B are each a schematic cross-sectional view illustrating a configuration of upper and lower attachment units for a fixed shaft in the optical deflector of Comparative Example (conventional art);
FIG. 7 shows measurement results of vibration generated with respect to the number of rotations, for the optical deflector 1 of the first embodiment and that of Comparative Example;
FIG. 8 is a cross-sectional view of an optical deflector 201 according to a second embodiment.

PREFERRED MODE FOR CARRYING OUT THE INVENTION

First Embodiment

Figure 2:
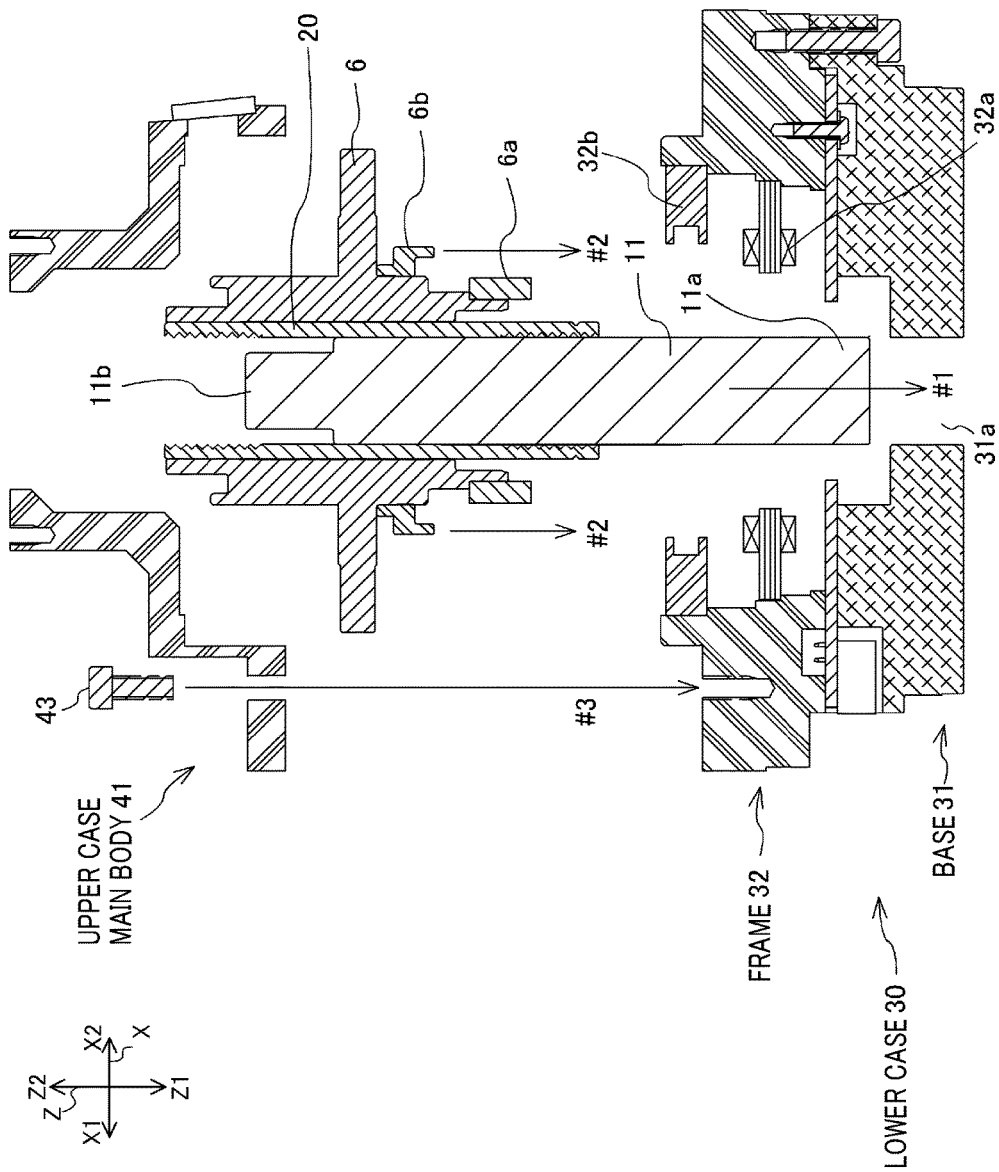
FIG. 2 is a diagram illustrating a manufacturing method of the optical deflector according to the first embodiment;
Each of FIGS. 3A-3C is another diagram illustrating the manufacturing method of the optical deflector according to the first embodiment.

A first embodiment of the present invention is described hereinafter with reference to the drawings and the like.
FIG. 1 is a cross-sectional view of an optical deflector 1 according to the first embodiment.
FIG. 1A is a cross-sectional view of an entirety of the optical deflector 1.
FIG. 1B is an enlarged view of a part B for a sleeve 20 in particular.
FIG. 1C is an enlarged view of the part B for the sleeve 20 and a fixed shaft 11.
For the sake of convenience, descriptions will be given for embodiments and drawings by using the disposition illustrated in FIG. 1 as a reference and referring to directions: a lateral direction as X, a depth direction as Y, and a vertical direction as Z.

The optical deflector 1 is a device for deflecting beams of light to a desired direction by rotating a polygon mirror 2 at a high speed. A rated number of rotations of the embodiment is, for example, at least 60,000 (r/min).

A motor 5 includes a rotor 6 and a bearing 10 as the fluid dynamic bearing.

The motor 5 is a direct-current motor in which the rotor 6 rotates around the fixed shaft 11 by a magnetic field generated by a coil of a stator 32a and a permanent magnet 6a of the rotor 6. In addition, a permanent magnet 32b provided at a lower case 30 and an iron cylinder 6b of the rotor 6 constitute a thrust bearing in which an attracting force of the permanent magnet 32b acts on the cylinder 6b, such that a position of the rotor 6 is maintained in a thrust direction (axial direction of the rotational shaft). A polygon mirror 2 is fixed on an outermost periphery of the rotor 6.

The bearing 10 includes the fixed shaft 11, the sleeve 20, the lower case 30 as a fixing case, and an upper case 40 as a retaining case.

The fixed shaft 11 extends in a vertical direction Z to be disposed inside the lower case 30 and the upper case 40.

The sleeve 20 is a cylindrical member. The sleeve 20 is provided rotatably around the fixed shaft 11. The rotor 6 of the motor 5 is fixed to an outer periphery of the sleeve 20. Accordingly, the sleeve 20 and the rotor 6 rotate integrally with each other around a central axis of the fixed shaft 11. A length L1 of a designed clearance 20a between an inner peripheral surface of the sleeve 20 and an external peripheral surface of the fixed shaft 11 (refer to FIG. 1C) is, for example, several μm on each side in case of a diameter of the fixed shaft 11 being approx. 10 mm. It should be noted that the clearance is not in direct relationship with the length of the fixed shaft 11, and is defined appropriately according to the type of a fluid bearing.

The inner peripheral surface of the sleeve 20 includes a central portion 21 and dynamic pressure generating portions 22 and 23.

The central portion 21 lies in a central region on the inner peripheral surface of the sleeve 20.

The dynamic pressure generating portions 22 and 23 lie on a lower side Z1 and on an upper side Z2 of the inner peripheral surface of the sleeve 20, respectively.

The dynamic pressure generating portion 22 includes a groove 22a of a helix (refer to FIG. 1B and FIG. 1C). Likewise, the dynamic pressure generating portion 23 includes a helical groove in a different direction from the groove 22a.

The dynamic pressure generating portions 22 and 23 cause the air to flow into the clearance 20a between the central portion 21 and the fixed shaft 11 (refer to an arrow A1 shown in FIG. 1C) due to the rotor 6 and the sleeve 20 which rotate integrally with each other at a time of driving the motor. This causes air pressure to increase in the clearance 20a, such that the inner peripheral surface of the sleeve 20 and the fixed shaft 11 maintain stably not in contact with each other. As a result, the bearing 10 functions as a bearing in a radial direction (direction orthogonal to a rotational axis).

The lower case 30 and the upper case 40 fix and hold the fixed shaft 11, and rotatably enclose the rotor 6. The lower case 30 is a case member on the lower side Z1 of the bearing 10 and the upper case 40 is a case member on the upper side Z2 of the bearing 10. The lower case 30 and the upper case 40 are members that function also as case members for the optical deflector 1 and the motor 5.

An inner space 30a of the lower case 30 and the upper case 40 is sealed by a seal member and the like (not illustrated). In operation, the air in the inner space 30a flows into the clearance 20a to generate the dynamic pressure required for supporting the rotor 6, while the unnecessary air in the inner space 30a is evacuated outside the motor 5 through an outlet (not illustrated). Accordingly, the inner space 30a turns out substantially vacuum. In this connection, the dynamic pressure generating portions 22 and 23 can continue to generate the dynamic pressure required for supporting the rotor 6 even if the inner space 30a is in a substantially vacuum state.

It should be noted that, a pump mechanism for making the inner space 30a a vacuum (not illustrated) and the bearing 10 are integrally provided in the present embodiment; however, the pump mechanism may be provided separately from the bearing 10.

Alternatively, it is not necessarily required to make the inner space 30a a vacuum.

The lower case 30 includes a base 31 and a frame 32 that is screwed onto the base 31.

Between the base 31 and the frame 32, an electronic substrate 33 for controlling the motor 5 is fixed. The base 31 and the frame 32 may also be configured integrally.

The base 31 is a member serving as a base for the bearing 10. The base 31 is disk-shaped.

The base 31 includes a press-fit hole 31a.

The press-fit hole 31a is a through hole running in the vertical direction Z. A lower end 11a, which lies on the first end side of the fixed shaft 11, is pressed into the press-fit hole 31a. Accordingly, the lower case 30 fixes the lower end 11a of the fixed shaft 11.

The frame 32 is fixed onto an upper face of the base 31. A stator 32a and the permanent magnet 32b of the thrust bearing are fixed to the frame 32.

The upper case 40 includes an upper case main body 41 as a case main body, a top cover 50 as a retainer, and a screw 60.

The upper case main body 41 is a frame that is screwed onto the frame 32 of the lower case 30.

The upper case main body 41 includes a screw hole 41a and a window 41b.

Four screw holes 41a are provided on an upper face of the upper case main body 41 for mounting the top cover 50.

The window 41b is a through aperture for transmitting deflected light. The window 41b has a transparent glass plate 42.

The top cover 50 is a cover member that is mounted to cover an upper opening of the upper case main body 41.

Top cover 50 includes a hole 51 and a chuck 52.

The hole 51 is a through hole into which a thread portion of the screw 60 is inserted. Four holes 51 are provided at positions corresponding to screw holes 41a of the upper case main body 41. As described later, the hole 51 has such a diameter that can compensate eccentricity of the fixed shaft 11 upon mounting. In other words, the diameter of the hole 51 is sufficiently greater than a diameter of the thread portion of the screw 60.

The screw hole 41a on the upper case main body 41, the hole 51 on the top cover 50, and the screw 60 compose a fastening portion for fastening the top cover 50 to the upper case main body 41.

The chuck 52 is a portion that holds the upper end 11b, which is the second end of the fixed shaft 11, to the top cover 50. The chuck 52 has a shape like a collect chuck. A cylinder portion 53 of the chuck 52 includes a tapered male screw (refer to FIG. 1A) whose diameter increases toward a base, and four slits 53b that are provided on the cylinder 53 in the vertical direction Z, for example. A nut 55 has a tapered female screw whose internal diameter decreases gradually. As the cylinder 53 is fastened by the nut 55, four sections 53a serving as a deformable retainer of the cylinder 53 (refer to FIG. 3) deform elastically, such that the four sections 53a come in contact with and fasten the upper end 11b of the fixed shaft 11. Accordingly, the chuck 52 holds the fixed shaft 11 rigidly.

The upper case main body 41 and the top cover 50 are composed of not an integral member but separate members. Accordingly, it is possible to facilitate processing of the male screw of the chuck 52 and the like only for the top cover 50.

It should be noted that, sealing by an O-ring, for example, may be provided between the top cover 50 and the fixed shaft 11, and between the top cover 50 and the upper case main body 41, respectively, in order to render the inner space 30a to be better sealed.

(Manufacturing Method)

FIG. 2, FIGS. 3A-3C and FIG. 4 are diagrams illustrating a manufacturing method of the optical deflector according to the first embodiment.

FIG. 2 is a cross-sectional view illustrating mounting of the upper case main body 41 onto the lower case 30.

Figure 3A:
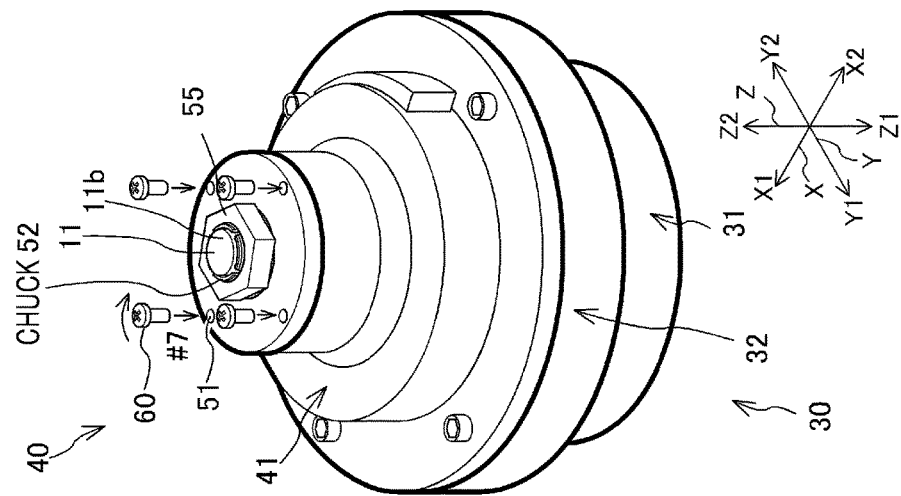
Figure 3B:
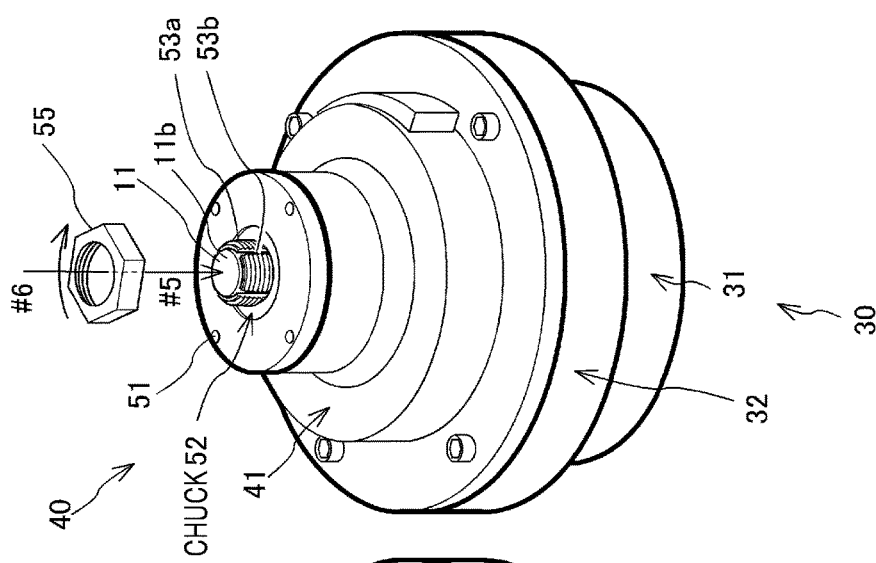
Figure 3C:
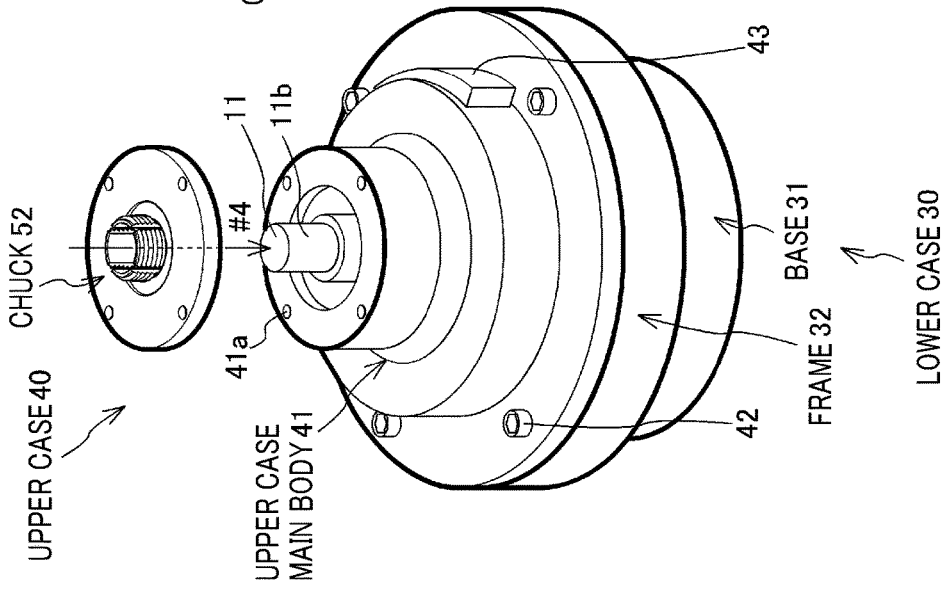

Each of FIGS. 3A-3C is a perspective view illustrating mounting of the top cover 50.

FIG. 4 is a cross-sectional view illustrating fixing of the upper end 11b of the fixed shaft 11.

An operator manufactures the optical deflector 1 in a manner as shown below.

The assembly of the motor 5 is supposed to have been completed to a state in which the lower case 30 is as illustrated in FIG. 2.

(#1) Fixing Step of Lower End 11a of Fixed Shaft 11

As illustrated in FIG. 2, the fixed shaft 11 is pressed into the press-fit hole 31a at the base 31 of the lower case 30. Accordingly, the lower end 11a of the fixed shaft 11 is fixed rigidly to the lower case 30.

(#2) Rotor Mounting Step

The sleeve 20 that is integrated with the rotor 6 is mated with the fixed shaft 11.

(#3) Main Case Mounting Step

The lower case 30 is screwed to the upper case main body 41 of the upper case 40 by the screw 43.

(#4) Chuck Mating Step

As illustrated in FIGS. 3A and 3B, the chuck 52 of the top cover 50 is mated with the upper end 11b of the fixed shaft 11 to thereby bring a lower face of the chuck 52 into contact with the upper face of the upper case main body 41.

(#5) Chuck Fastening Step

As illustrated in FIGS. 3B and 3C, the chuck 52 is fastened by the nut 55 in a state in which the lower face of the chuck 52 is in contact with the upper face of the upper case main body 41. As a result, the sections 53a of the chuck 52 are in contact with the fixed shaft 11 by elastic deformation, to thereby hold the fixed shaft 11.

(#7) Top Cover Fixing Step

As illustrated in FIGS. 3C and 4, the screw 60 is inserted into the hole 51 of the top cover 50, and then the top cover 50 is secured to the upper case main body 41 by the screw 60. As described above, the hole 51 of the top cover 50 is sufficiently large in diameter compared with the screw 60. Accordingly, the upper end 11b of the fixed shaft 11 is held inclined if the fixed shaft 11 is fixed with inclination with respect to the press-fit hole 31a of the lower case 30 (refer to an inclination direction θ).

As illustrated in FIG. 4, the fastening portion (the screw hole 41a, hole 51, and screw 60) fastens the top cover 50 freely to the upper case main body 41 with respect to the inclination direction θ, in other words, in a state in which no excessive force is applied to the top cover 50 and the upper end 11b of the fixed shaft 11 in the inclination direction θ. Accordingly, it is possible to fix the upper case 40 rigidly to the lower case 30 without generating a force which displaces the central axis of the fixed shaft 11.

As a result, the upper end 11b is held inclined if the fixed shaft 11 is fixed to the lower case 30 with the inclination. In this manner, both ends of the fixed shaft 11 are fixed to the lower case 30 and the upper case 40 free of axial eccentricity (axial runout).

As discussed above, in the optical deflector 1, the upper end 11b of the fixed shaft 11 is fixed by the chuck 52 of the top cover 50 and then the top cover 50 is screwed to the upper case main body 41. This allows the optical deflector 1 to perform rigid fixation of the fixed shaft 11 without the axial eccentricity.

(Mounting Structure of Fixed Shaft 411 of Comparative Example)

Axial eccentricity of a fixed shaft is described hereinafter with reference to Comparative Example.

FIG. 5 and FIGS. 6A and 6B are cross-sectional views illustrating a conventional optical deflector as Comparative Example.

FIG. 6 is a schematic cross-sectional view illustrating only upper and lower attachment units for a fixed shaft 411 of Comparative Example.

An upper end 411b of the fixed shaft 411 is mounted to a hole 441 of an upper case 440 by press fitting and the like in the conventional art as illustrated in FIG. 5, differing from the embodiment of the present invention.

Here, a positional relationship between the hole 441 of the upper case 440 and a press-fit hole 431a of the lower case 430 is defined when the upper case 440 is mounted to the lower case 430 via a frame 432. Under this situation, a stress in a bending direction is applied to the fixed shaft 411 (in FIG. 6, misalignment and inclination are exaggerated for the sake of explanation but are actually in a slight amount within the dimensional tolerance), if the hole 441 (axial center) and the press-fit hole 431a (axial center) are misaligned or inclined with each other as illustrated in FIG. 6A or in FIG. 6B.

It has been possible to meet performance requirements as far as the number of rotations is low, even if the fixed shaft 411 has a minuscule amount of bending caused by misalignment or inclination within the dimensional tolerance manufacturally attainable. Accordingly, the setup of an optical deflector 401 has been acceptable so far.

However, it has been confirmed that even the minuscule amount of bending in the fixed shaft 411 has a significantly adverse impact on the bearing performance for a case of a fluid bearing of high accuracy for which high-speed rotation is required.

With the above described configuration and manufacturing method, the optical deflector 1 has effects as described below.

(1) The fixed shaft 11 is held by the chuck 52, differing from the configuration of bonding the fixed shaft 11 to the top cover 50. In addition, the top cover 50 is screwed to the upper case main body 41. This allows disassembly after manufacturing and easy maintenance (parts replacement, repair, etc.).

(2) It is possible to increase a resonant frequency by fixing and holding rigidly both ends of the fixed shaft 11. Accordingly, it is possible to suppress resonant vibration for high-speed rotation, and to provide the bearing 10 applicable to use under the number of rotations higher than conventional ones. In addition, it is possible to decrease damage to the bearing 10 and a beat sound due to vibration, and to thereby improve durability and extend lifetime of the motor 5.

(3) It is possible to fix and hold the fixed shaft 11 in a state in which the deformation of the fixed shaft 11 is suppressed without applying stress to the fixed shaft 11 in a bending direction. Accordingly, it is possible to perform manufacturing with a gap between the fixed shaft 11 and the sleeve 20 maintained as the clearance 20a of a designed dimension. In this manner, it is possible to suppress friction and the like between the sleeve 20 and the fixed shaft 11.

(4) It is possible to render the length of the fixed shaft 11 to be longer than conventional ones, since it is possible to increase the resonant frequency. Accordingly, it is possible to increases design flexibility and allow application to a large-sized product.

(Comparative Test)

FIG. 7 shows measurement results of vibration generated with respect to the number of rotations, for the optical deflector 1 of the first embodiment and for Comparative Example.

Comparative Example is of a cantilever optical deflector in which an upper end of a fixed shaft is not held, but other elements are similar to those of the optical deflector 1 of the first embodiment.

Testing was performed through measuring acceleration generated in the optical deflector by an accelerometer, when the motor started rotating from a rest up to the number of rotations of 70000 (r/min).

As shown in FIG. 7, the optical deflector 1 of the embodiment revealed that the acceleration caused by vibration was lower than 2 (m/s$^2$). In addition, the optical deflector 1 of the embodiment created no noise caused by friction and the like between the sleeve 20 and the fixed shaft 11.

In contrast, the optical deflector of Comparative Example resonated at approx. 45,000 (r/min) and acceleration caused by vibration increased to approx. 9 (m/s$^2$). Given this, a motor whose rated number of rotations is at least approx. 45,000 (r/min) goes through the resonance point inevitably, during increase of rotating speed upon startup, during decrease of rotating speed upon shutdown, and the like. Accordingly, Comparative Example, which suffers from substantial damage to the bearing caused by vibration (such as damage caused by friction between the sleeve and the fixed shaft), has low durability and a shorter lifetime.

This experiment has demonstrated that the optical deflector 1 of the embodiment allows manufacturing thereof in accordance with the clearance 20a between the sleeve 20 and the fixed shaft 11 as designed, and applying thereof to a higher-revolution type product.

As discussed above, the optical deflector 1 of the present embodiment allows attachment of the fixed shaft 11 to the case while suppressing axial eccentricity thereof. Accordingly, it is possible that the optical deflector 1 is applicable to a higher-revolution type product and increases durability.

Second Embodiment

A second embodiment of the present invention is described hereinafter.

It should be noted that in the following description and the drawings, portions having similar functions to those of the first embodiment are referred to with the same reference numerals or with reference numerals having the same last two digits and repetitive descriptions are omitted as appropriate.

FIG. 8 is a cross-sectional view of an optical deflector 201 according to the second embodiment.

The optical deflector 201, a motor 205, and a bearing 210 (fluid dynamic bearing) are configured such that an upper case main body 241 of an upper case 240 is bonded to a top cover 250 by an adhesive 251, differing from the first embodiment of fastening by a screw.

The manufacturing method of the optical deflector 201 of the second embodiment includes bonding the upper case main body 241 to the top cover 250 with the adhesive 251 (refer to #207 shown in FIG. 8) after the chuck fastening step (refer to FIGS. 3B and 3C).

It is possible that the optical deflector 201 is assembled while suppressing axial eccentricity of the fixed shaft 11 as in the first embodiment.

In addition, it is possible for the optical deflector 201 to reduce the number of components and simplify the configuration.

Third Embodiment

A third embodiment of the present invention is described hereinafter.

Figure 9:
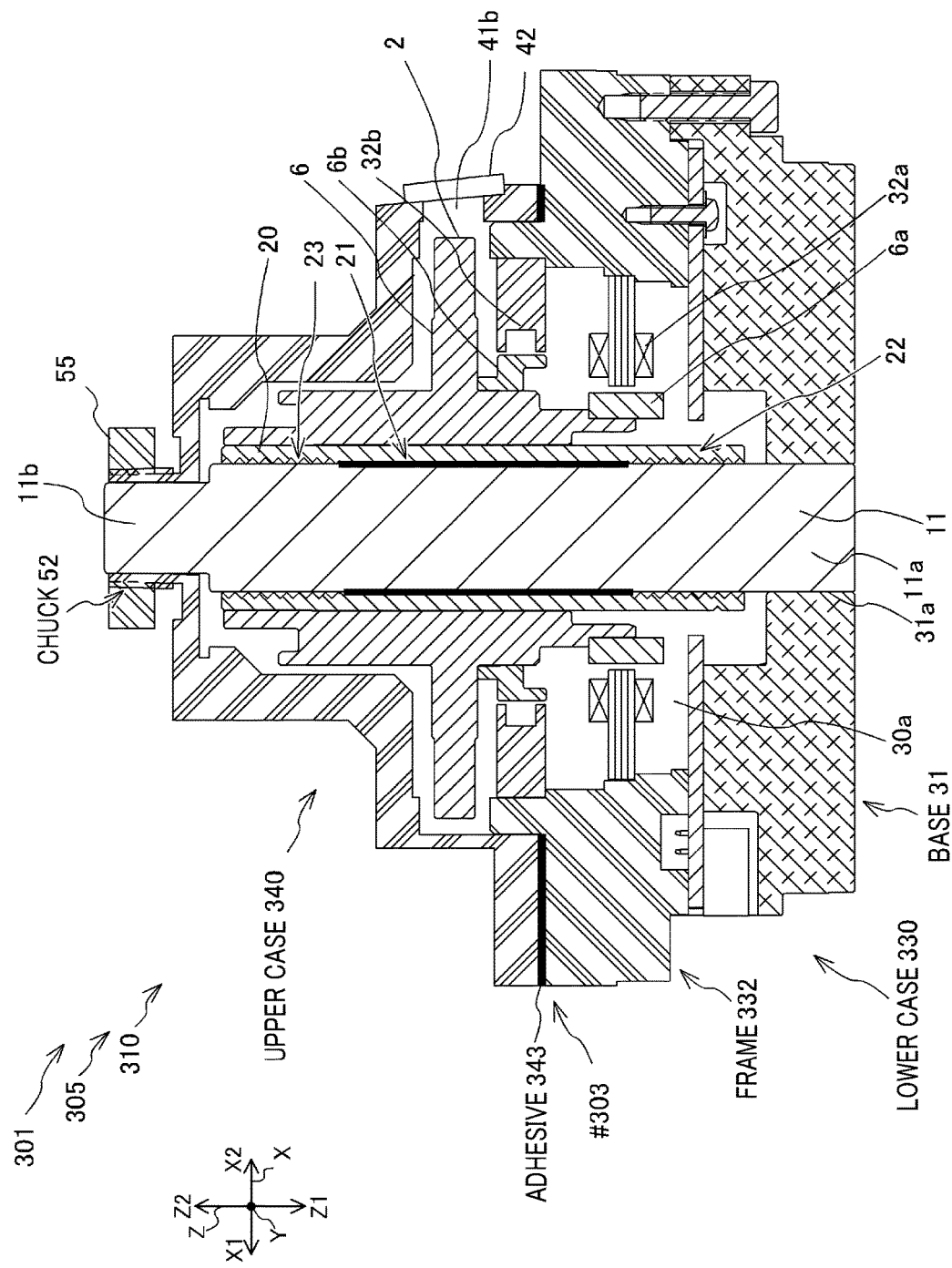
FIG. 9 is a cross-sectional view of an optical deflector 301 according to a third embodiment.

FIG. 9 is a cross-sectional view of an optical deflector 301 according to the third embodiment.

The optical deflector 301, a motor 305, and a bearing 310, an upper case main body of an upper case 340 and a top cover are configured such that the upper case 340 is bonded to a frame 332 of a lower case 330 by an adhesive 343.

The manufacturing method of the optical deflector 301 includes the chuck inserting step (step #4 shown in FIG. 3A) and subsequent steps without the main case mounting step (step #3 shown in FIG. 2), after the rotor mounting step (refer to step #2 shown in FIG. 2).

Subsequently, the upper case 340 is bonded to the frame 332 of the lower case 330 by the adhesive 343 (refer to #303 shown in FIG. 9) after the top cover fixing step (step #7 shown in FIG. 3C).

It is possible that the optical deflector 301 is assembled while suppressing axial eccentricity of the fixed shaft 11 as in the first embodiment.

In addition, it is possible for the optical deflector 301 to reduce the number of components and simplify the configuration.

Alternatively, it is possible that the upper case 340 is also screwed to the frame 332 of the lower case 330 as in the first embodiment, not by bonding by the adhesive 343. In this case, it is possible that the optical deflector 301 is easily disassembled after manufacture, and maintenance thereof is facilitated.

The embodiments of the present invention have been described heretofore; however, the present invention is not limited to the above discussed embodiments and, various modifications and changes can be made without departing from the technical scope of the present invention, such as the modification described below. In addition, the effects mentioned in the embodiments are merely an enumeration of most preferable effects of the present invention and the effect of the present invention is not limited to those mentioned in the embodiments. Although detailed description is omitted, the above discussed embodiments and the modification described below can be appropriately employed in combination.

(Modification)

In the embodiments, the bearing employing air as the fluid has been exemplified; however, the present invention is not limited thereto. In the case of not making the inner space a vacuum, oil (liquid) may also be employed as the fluid.

Furthermore, an example of providing the dynamic pressure generating portion on the inner peripheral surface of the sleeve has been given; however, it is obvious that the dynamic pressure generating portion may also be provided on the outer periphery of the fixed shaft.

EXPLANATION OF REFERENCE NUMERALS 1, 201, 301 Optical deflector
2 Polygon mirror
5, 205, 305 Motor
6 Rotor
10, 210, 310 Bearing
11 Fixed shaft
11a Lower end
11b Upper end
20 Sleeve
22, 23 Dynamic pressure generating portion
30, 330 Lower case
31 Base
31a Press-fit hole
32, 332 Frame
40, 240, 340 Upper case
41, 241 Upper case main body
41a Screw hole
43 Screw
50, 250 Top cover
51 Hole
52 Chuck
53 Cylinder portion
53a Sections
55 Nut
251, 343 Adhesive

The invention claimed is:

1. A fluid dynamic bearing comprising: a fixed shaft;
a sleeve provided rotatably around the fixed shaft;
a dynamic pressure generating portion provided to at least one of the fixed shaft and the sleeve;
a fixing case configured to fix a first end of the fixed shaft, wherein the fluid dynamic bearing further comprises a retaining case that has a chuck for retaining a second end of the fixed shaft that is fixed by the fixing case, the retaining case being configured to be fixable to the fixing case without generating a force to cause a central axis of the fixed shaft to move.

2. A motor comprising the fluid dynamic bearing according to claim 1.

3. An optical deflector comprising the motor according to claim 2.

4. The fluid dynamic bearing according to claim 1, wherein the chuck is provided with a deformable retainer configured to be in contact with the fixed shaft by elastic deformation, such that the deformable retainer retains the fixed shaft.

5. A motor comprising the fluid dynamic bearing according to claim 4.

6. An optical deflector comprising the motor according to claim 5.

7. The fluid dynamic bearing according to claim 1, wherein the retaining case comprises:
a retainer provided with the chuck for retaining the second end of the fixed shaft; and
a case main body to which the retainer is freely attached.

8. A motor comprising the fluid dynamic bearing according to claim 7.

9. An optical deflector comprising the motor according to claim 8.

10. The fluid dynamic bearing according to claim 7, wherein the chuck is provided with a deformable retainer configured to be in contact with the fixed shaft by elastic deformation, such that the deformable retainer retains the fixed shaft.

11. A motor comprising the fluid dynamic bearing according to claim 10.

12. An optical deflector comprising the motor according to claim 11.

13. The fluid dynamic bearing according to claim 7, further comprising a fastening portion at which the retainer is fastened freely to the case main body with a screw.

14. A motor comprising the fluid dynamic bearing according to claim 13.

15. An optical deflector comprising the motor according to claim 14.

16. The fluid dynamic bearing according to claim 13, wherein the chuck is provided with a deformable retainer configured to be in contact with the fixed shaft by elastic deformation, such that the deformable retainer retains the fixed shaft.

17. A motor comprising the fluid dynamic bearing according to claim 16.

18. An optical deflector comprising the motor according to claim 17.

* * * * *